US009153993B2

(12) United States Patent
Walley et al.

(10) Patent No.: US 9,153,993 B2
(45) Date of Patent: Oct. 6, 2015

(54) SMART CHARGING SYSTEM AND RELATED METHOD

(75) Inventors: John Walley, Ladera Ranch, CA (US); Robert Hulvey, Redondo Beach, CA (US)

(73) Assignee: BROADCOM CORPORATION, Irvine, CA (US)

( * ) Notice: Subject to any disclaimer, the term of this patent is extended or adjusted under 35 U.S.C. 154(b) by 248 days.

(21) Appl. No.: 13/004,820

(22) Filed: Jan. 11, 2011

(65) Prior Publication Data

US 2011/0181235 A1    Jul. 28, 2011

Related U.S. Application Data

(60) Provisional application No. 61/336,846, filed on Jan. 26, 2010.

(51) Int. Cl.
*H02J 7/00* (2006.01)
*H02J 3/14* (2006.01)
(Continued)

(52) U.S. Cl.
CPC ............... *H02J 7/02* (2013.01); *H02J 7/0004* (2013.01); *H02J 7/008* (2013.01); *H02J 7/0055* (2013.01); *H02J 7/025* (2013.01); *H02J 2007/0096* (2013.01)

(58) Field of Classification Search
CPC ............ H02J 17/00; H02J 1/00; H02J 5/005; H02J 7/0004; H02J 7/0011; H02J 7/0022; H02J 7/0031; H02J 7/0036; H02J 7/0052; H02J 7/0055; H02J 7/0068; H02J 7/0072; H02J 7/02; H02J 7/022; H02J 7/041; H02J 7/042; H02J 7/045; H02J 7/082; H02J 2001/008; H02J 2007/0029; H02J 2007/0037; H02J 2007/0039; H02J 2007/0098; H02J 2007/02; H02J 2007/04; H02J 2007/10; H02J 7/0021; H02J 7/0026; H02J 7/0029; H02J 7/007; H02J 7/0073; H02J 7/0077; H02J 17/027; H02J 2007/0062; H02J 2007/0052; H02J 2007/0096; H02J 2007/62; H02J 7/008; H02J 7/025; Y04S 10/50; Y04S 20/10; Y04S 20/12; Y04S 20/14; Y04S 20/242; Y04S 20/248; Y04S 40/121; Y04S 40/14; Y04S 10/24; Y04S 20/221; H01Q 1/248; H01Q 1/2225; H01Q 1/2291; G06F 9/00; G06F 15/04; G06F 2009/00; G06F 1/1632; G06F 1/26; G06K 19/0715
USPC ............... 340/3.1, 500, 540, 657, 7.33, 13.23, 340/572.1, 825.17, 636.18, 636.2; 455/572, 455/574, 512, 522, 127.1, 343.1, 423, 573; 307/31–41, 126, 311, 150, 66, 29, 104; 320/103, 107, 108, 137, 150, 119, 124, 320/134, 160
See application file for complete search history.

(56) References Cited

U.S. PATENT DOCUMENTS 6,754,092 B2 * 6/2004 McDowell et al. ............. 363/89
7,766,698 B1 * 8/2010 De Iuliis et al. .............. 439/638
(Continued)

FOREIGN PATENT DOCUMENTS

WO    WO 2010/057224 A1    5/2010

OTHER PUBLICATIONS

Chinese Office Action dated Nov. 22, 2013, in corresponding Chinese application No. 21210004160.4.
(Continued)

*Primary Examiner* — Mirza Alam
(74) *Attorney, Agent, or Firm* — Oblon, McClelland, Maier & Neustadt, L.L.P.

(57) ABSTRACT

According to one disclosed embodiment, a smart charging system includes a power conversion unit having a communication module and a charging integrated circuit that can convert mains power into a managed charging power used to charge any of several electronic devices. In one embodiment, a power conversion unit can manage a charging process by communicating with a connected electronic device and exchanging a charge profile representing ideal characteristics of the charging power. In one embodiment, an electronic device receives a charge from a power conversion unit through a wired power conduit. In another embodiment, an electronic device receives a charge from a power conversion unit through a wireless power conduit. In one embodiment, the smart charging system includes a battery usable to charge an electronic device when a mains adapter of the smart charging system is not powered.

20 Claims, 4 Drawing Sheets

(51) Int. Cl.
*G08B 21/00* (2006.01)
*H02J 7/02* (2006.01)

(56) References Cited

U.S. PATENT DOCUMENTS

| | | | |
|---|---|---|---|
| 2006/0271800 A1* | 11/2006 | Li et al. .................... | 713/300 |
| 2008/0081676 A1* | 4/2008 | Chakraborty et al. ...... | 455/574 |
| 2008/0106148 A1* | 5/2008 | Gelonese .................... | 307/39 |
| 2009/0235107 A1* | 9/2009 | Gelonese .................... | 713/340 |
| 2009/0271047 A1* | 10/2009 | Wakamatsu ................ | 700/295 |
| 2010/0007307 A1* | 1/2010 | Baarman et al. ............ | 320/108 |
| 2010/0019583 A1* | 1/2010 | DuBose et al. ............. | 307/126 |
| 2010/0146308 A1* | 6/2010 | Gioscia et al. .............. | 713/300 |
| 2010/0244576 A1* | 9/2010 | Hillan et al. ................ | 307/104 |
| 2010/0279606 A1* | 11/2010 | Hillan et al. ................ | 455/41.1 |
| 2011/0260556 A1* | 10/2011 | Partridge et al. ........... | 307/150 |

OTHER PUBLICATIONS

"Combined Antenna and Inductive Power Receiver" Ben-Shalom, et al. Apr. 1, 2010 <http://www.sumobrain.com/patents/wipo/Combined-antenna-inductive-power-receiver/WO2010035256.html>.

"Verizon LG Decoy Cell Phone Integrated Bluetooth Headset Now Available" Andrew Tingle Jun. 17, 2008 <http://nexus404.com/Blog/2008/06/17/verizon-lg-decoy-cell-phone-integrated-bluetooth-headset-now-available-lg-vx8610-multimedia-handset-hits-verizon/>.

* cited by examiner

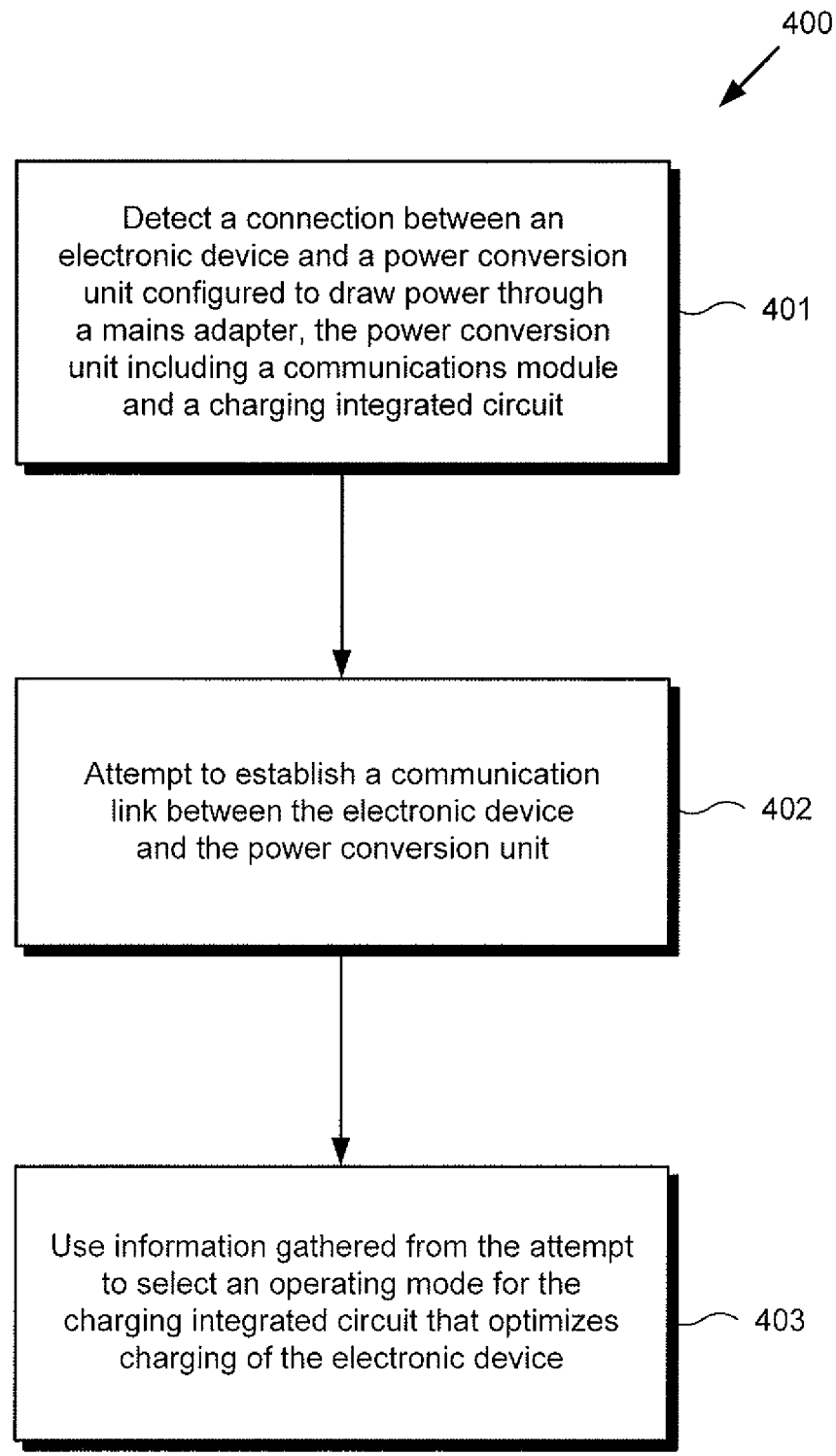

SMART CHARGING SYSTEM AND RELATED METHOD

RELATED APPLICATIONS

This application is based on and claims priority from U.S. Provisional Patent Application Ser. No. 61/336,846, filed on Jan. 26, 2010, which is hereby incorporated by reference in its entirety.

BACKGROUND OF THE INVENTION

1. Field of the Invention

The present invention is generally in the field of electronic devices and systems. More particularly, the present invention is in the field of delivery of power to electronic devices and systems.

2. Background Art

The use of battery operated electronic devices continues to proliferate into all aspects of daily life, from the commonplace laptop to all the innovative accessories designed for convenient use of portable electronic devices. As demand for these devices has expanded, so has the demand for higher reliability, efficiency and convenience with respect to both the manufacturing and the operating life of the devices.

Conventional power supplies used to charge battery operated electronic devices are typically inefficient and unconfigurable, mainly to reduce manufacturing cost, but also because general safety and liability concerns steer manufacturers towards designing their power supplies to be physically differentiated from product to product so as to limit the risk of damage due to incompatible voltage and current specifications. Because each matched power supply is typically designed to serve only a very limited market for a limited amount of time (e.g., the life of a single product), little effort is invested into designing high efficiency and reliability into each iteration of the generic power supply. Further, the lack of interchangeability typically leads to consumers having multiple collections of conventional power supplies at home, at work, and even in their car, for example.

Thus, there is a need to overcome the drawbacks and deficiencies in the art by providing a charging system that can be readily adapted to charge electronic devices efficiently, reliably and conveniently.

SUMMARY OF THE INVENTION

The present invention is directed to a smart charging system and related method, substantially as shown in and/or described in connection with at least one of the figures, as set forth more completely in the claims.

BRIEF DESCRIPTION OF THE DRAWINGS

FIG. 4 shows a flowchart illustrating steps taken to implement a method for charging an electronic device, according to an embodiment of the present invention.

DETAILED DESCRIPTION OF THE INVENTION

Figure 1:
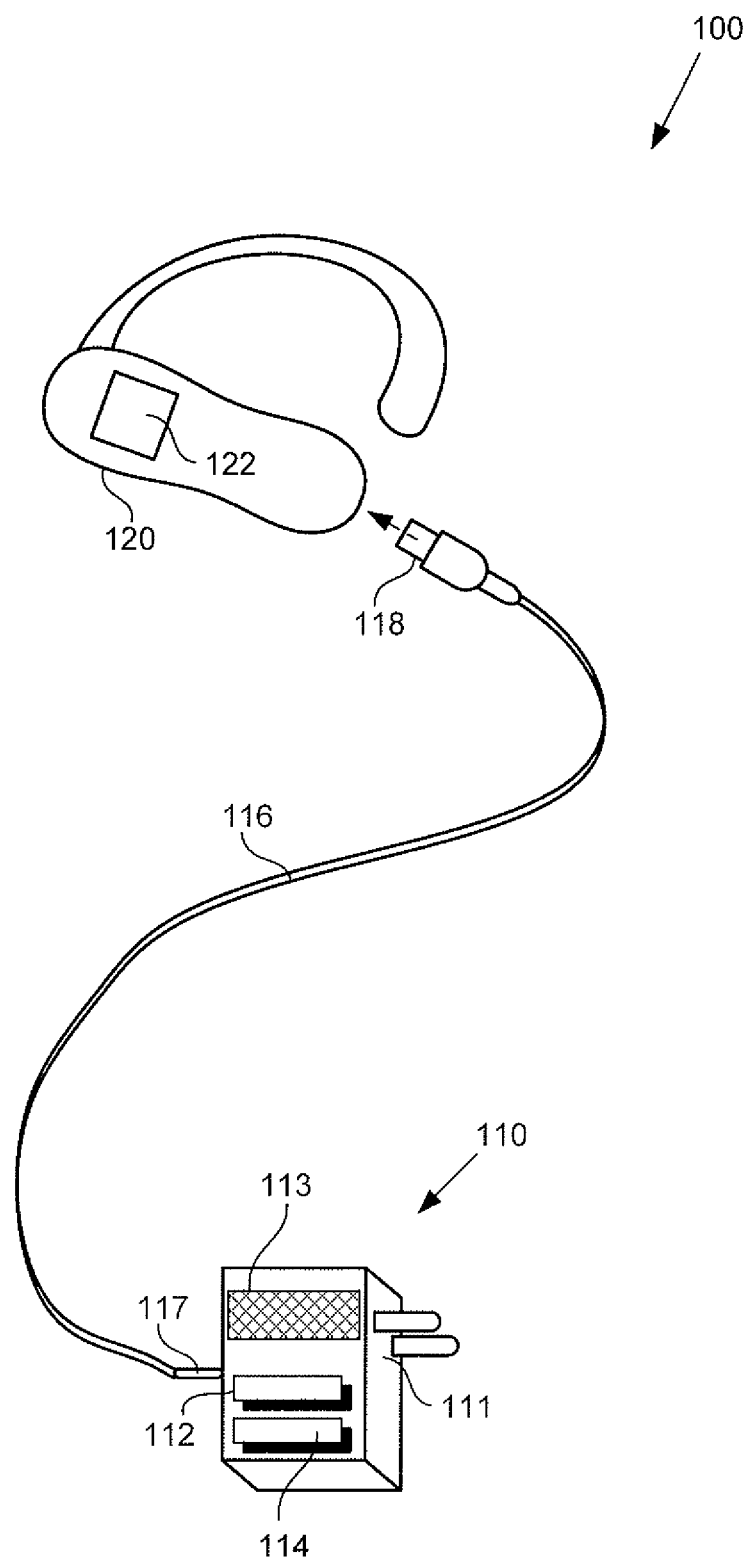
FIG. 1 illustrates a modular view of a smart charging system, according to one embodiment of the present invention.

The present invention is directed to a smart charging system and related method. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention.

The drawings in the present application and their accompanying detailed description are directed to merely exemplary embodiments of the invention. To maintain brevity, other embodiments of the present invention are not specifically described in the present application and are not specifically illustrated by the present drawings. It should be understood that unless noted otherwise, like or corresponding elements among the figures may be indicated by like or corresponding reference numerals. Moreover, the drawings and illustrations in the present application are generally not to scale, and are not intended to correspond to actual relative dimensions.

Conventional charging systems suffer from many inefficiencies tied to their inability to be used universally. For example, at the end of the life of a typical electronic device, its charging system is often simply thrown away because it is incompatible with other electronic devices. Knowing this, manufactures typically build their charging systems as cheaply as possible, and instead rely on secondary power regulation schemes built into the electronic devices themselves to refine the supplied power. This almost invariably produces undesirable, life-shortening heat or other damaging effects within the electronic devices, which compounds the overall material waste, especially over multiple product iterations. With respect to electrical inefficiency, not only do the secondary power regulation schemes waste a substantial amount of energy during charging (e.g., sometimes doubling the wasted power during charging), the associated charging logic and sensing circuitry often draws enough power from the battery of the electronic device to significantly reduce the charge life of a typical battery operated electronic device.

FIG. 1 illustrates a modular view of a smart charging system, according to one embodiment of the present invention, that is capable of overcoming the drawbacks and deficiencies of the conventional art. Smart charging system 100, in FIG. 1, includes power conversion unit (PCU) 110, electronic device 120 and wired power conduit 116. According to the embodiment shown in FIG. 1, PCU 110 can be configured to connect to a mains alternating current (AC) power line through a standard wall mounted electrical socket, using mains adapter 111, and to charge electronic device 120 using wired power conduit 116.

As shown in FIG. 1, wired power conduit 116 can be connected to PCU 110 through connector 117, which may be a fixed connection or a detachable modular connection, such as through a Universal Serial Bus (USB) interface plug-in connector, for example. Wired power conduit 116 can connect PCU 110 to electronic device 120 through modular connector 118, which may be a mini-USB connector, for example, or any modular connector suitable for providing an interface between wired power conduit 116 and an electronic device or system being charged. Wired power conduit 116 can serve as a power transfer connection between PCU 110 and electronic device 120 and can be used to transfer power to electronic device 120 to operate electronic device 120 and/or charge battery 122 of electronic device 120.

It is noted that although the embodiment shown in FIG. 1 represents PCU 110 in combination with a particular electronic device, e.g., electronic device 120, that representation is provided merely as an example. More generally, PCU 110 may be used to manage delivery of power for charging and/or operation for various individual electronic devices and/or systems, each requiring its own specific charging parameters. Alternatively, PCU 110 may be a dedicated device configured to manage charging for a specific electronic device or system. In any implementation, however, PCU 110 is configured to support a communication channel between itself and the electronic device or system to which it is connected.

As shown in FIG. 1, according to the present embodiment of smart charging system 100, PCU 110 includes communication module 112, battery 113 and charging integrated circuit (IC) 114. Communication module 112 can be configured to send and receive charging parameters between electronic device 120 and charging IC 114 over a communication channel established between PCU 110 and electronic device 120. In embodiments such as that shown in FIG. 1, in which power is transferred from PCU 110 to electronic device 120 over a wired connection, e.g., wired power conduit 116, the wired connection may also provide a communication channel for transfer of charging parameters. Communication module 112 can also be configured to support a separate wireless communication channel to electronic device 120, such as through a Bluetooth, Bluetooth LE, WiFi, Near Field Communication (NFC), or other suitable wireless communication protocol, for example, either in addition or as an alternative to a wired communication channel over wired power conduit 116. Additionally, although communication module 112 is depicted as separate from charging IC 114 in FIG. 1, it should be understood that in other embodiments, the above functionality of communication module 112 may be provided by an appropriately configured charging IC acting alone.

Charging IC 114 may comprise, for example, a microcontroller having multiple digital and analog input/output ports coupled to, for example, communication module 112 and a programmable variable power supply, as known in the art, and can be configured to use charging parameters received from electronic device 120 to manage various operating characteristics of the charging power delivered to electronic device 120. Depending on the detail of the information transmitted by electronic device 120, charging IC 114 can also be configured to monitor the charging power characteristics of PCU 110 for feedback on the progress of charging, for example, a battery (e.g., battery 122 of electronic device 120).

In one example, the presence of communication module 112 and charging IC 114 can enable charging IC 114 to set a current and/or voltage limit on power delivered to electronic device 120. Charging IC 114 can be configured to determine such limits by consulting a charging parameter such as, for example, a charging profile received from electronic device 120 over a communication channel. A charging profile may comprise, for example, an initial peak current level, a subsequent peak voltage level, and a cut-off minimum current level, each used in various procedural phases of safely charging a battery (e.g., battery 122 of device 120) as is known in the art. By monitoring the charging power characteristics of PCU 110 and consulting a charging profile that contains the current and voltage levels for phases of charging battery 122, charging IC 114 can determine an appropriate charging power to deliver to electronic device 120 in order to safely and efficiently charge battery 122. Moreover, charging IC 114 can combine the power monitoring information with a charging profile to estimate a capacity level for battery 122 by, for example, comparing the existing charging current to a cut-off minimum current level.

In another example, charging IC 114 can determine an appropriate charging power by consulting a periodically updated charging state of battery 122 as well as information contained in a charging profile for battery 122, both being charging parameters transmitted by electronic device 120. In addition to the information described above, or in the alternative, a charging profile may comprise safety and maintenance protocols, such as instructions imposing current and voltage limits in the event that battery 122 exceeds its particular maximum temperature or charge ratings while being charged, or instructions for varying current and voltage supplied to battery 122 over a period of time to recondition battery 122, for example. Furthermore, a charging profile may comprise battery design characteristics such as, for example, a designed capacity, a number of electrochemical cells, a manufacturer, and a chemistry of the relevant battery, as is known in the art. A charging state, in contrast, may comprise, for example, an existing capacity level, a manufacturing date, an existing temperature, and/or a target charge time (e.g., a time by which battery 122 should be fully charged), for example.

In this example, charging IC 114 can determine an appropriate charging power to deliver to electronic device by using information in a transmitted charging state and charging profile to construct a safe and efficient charging strategy for battery 122. For instance, although electronic device 120 may indicate that battery 122 is able to be fast-charged at a power level beyond the capacity of PCU 110, charging IC 114 can select an operating mode (e.g., a particular charging strategy) that minimizes the time to a full charge for battery 122 yet does not exceed the power capacity of PCU 110. To illustrate further, if, for example, a charging state indicates that the existing battery temperature is greater than the maximum temperature rating (e.g., a rating transmitted as part of a charging profile), charging IC 114 may disconnect power to electronic device 120. Alternatively, if a charging state additionally indicates that a target charge time is many hours away, charging IC 114 may apply a safe mode until the existing battery temperature of battery 122 drops below its maximum temperature rating, and then proceed with a safe and efficient charging strategy, as explained above. Such a safe mode can comprise, for example, a standardized output voltage expected at an initial power connection (e.g., before any communication takes place), such as a nominal 5 V, coupled with a minimal peak current level, such as 5-10 mA or 100-500 mA, for example, depending upon the particular implementation environment. In any event, the peak current setting is suitably, selected so as to be small enough to preclude any electrical damage yet be sufficient to power, for example, a connected electronic device's standardized communication circuitry.

In a third example, instead of charging IC 114 determining an appropriate charging power for electronic device 120 through consultation of, for example, a charging profile and a charging state, electronic device 120 may simply provide charging IC 114 a charging parameter comprising, for example, a particular desired voltage level. In this operating mode, electronic device 120 only transmits its desired charging power characteristics, e.g., current and/or voltage levels, to charging IC 114 and not an extensive charging profile, as described above. As a safety measure, charging IC 114 can be configured to monitor both the charging power characteristics and the communication link with electronic device 120, and in the event of a power spike or a failure in communication, can apply a safe mode or disconnect electronic device 120 completely until the undesirable status is resolved (e.g., by reestablishing a communication link).

The above described functionality allows PCU 110 to be used to charge any electronic device capable of transmitting charging parameters to charging IC 114, which enables smart charging system 100 to reduce the need for a separate conventional charger per electronic device. Also, the above features allow PCU 110 to offload charging logic, sensing and power regulation circuitry from electronic device 120, which may decrease the manufacturing cost of electronic device 120 as well as the power needs of and the waste heat generated in electronic device 120 during charging, as explained above. Further, because PCU 110 can be used with multiple devices and multiple generations of devices, there is an incentive for manufacturers to build higher efficiency and reliability into embodiments of the present invention than with conventional matched power supplies, which can, especially in the aggregate, substantially decrease waste of electrical and material resources.

As shown in FIG. 1, PCU 110 may additionally comprise battery 113. Although the term "battery" is conventionally used to refer to a collection of electrochemical cells used to store electrical power, the term, as used above and below, additionally includes any chargeable device configured to store electrical power, such as, for example, a voltage regulated capacitor. Battery 113 can therefore comprise, for example, any chargeable power storage device, and can be configured to power PCU 110 when mains adapter 111 is unpowered. Charging IC 114, in addition to having the features described above, can also be configured to charge battery 113 when mains adapter 111 is powered. As shown in FIG. 1, battery 113 can be configured to power PCU 110, thereby enabling all the power management and charging features described above with respect to PCU 110, communication module 112 and charging IC 114 when a connection to a power mains is impossible or inconvenient. Moreover, battery 113 may allow smart charging system 100 to be temporarily portable, which can allow PCU 110 to charge or power electronic device 120 during, for example, extended travel, up to the capacity of battery 113. Therefore, battery 113 can be configured to allow PCU 110 to act as a portable supplemental or secondary power source for electronic device 120.

Although not shown in FIG. 1, it is noted that PCU 110 may include various status indicators used to communicate, for example, an active communication link with electronic device 120, an applied safe mode, or the percentage capacity of battery 122 of electronic device 120 (e.g., a "fuel gauge" indicator). Each status indicator can comprise, for example, a single light emitting diode (LED) or series of LEDs, where each status indicator may be operated by charging IC 114, as known in the art.

Figure 2:
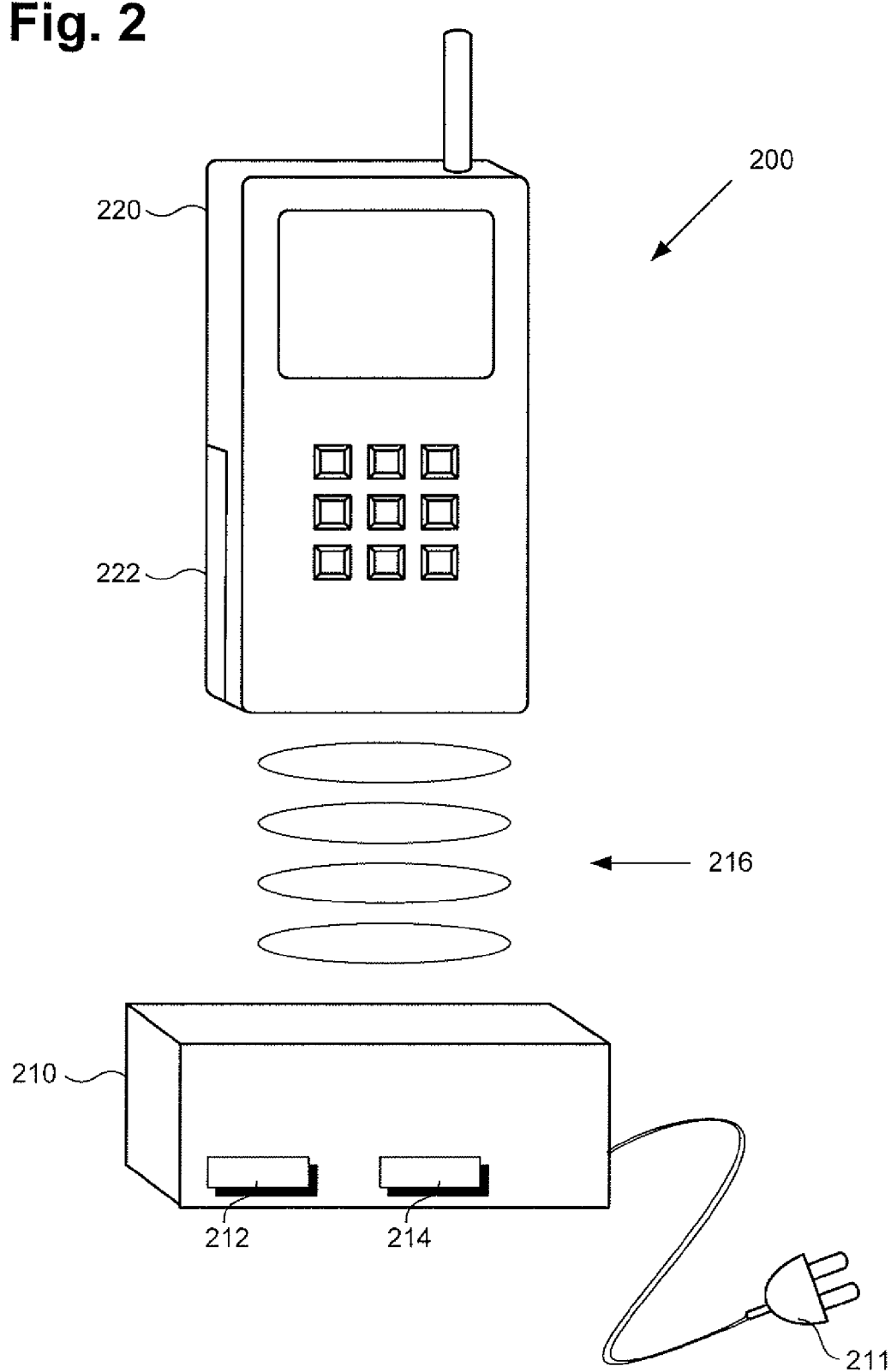
FIG. 2 illustrates a modular view of a smart charging system, according to a second embodiment of the present invention.

FIG. 2 illustrates an example of a smart charging system, according to the present inventive principles, which utilizes a wireless connection to charge an electronic device. Smart charging system 200 includes PCU 210, which is configured to draw power through mains adapter 211 and comprises communication module 212 and charging IC 214. Also shown in FIG. 2 is electronic device 220 having battery 222. PCU 210, communication module 212, charging IC 214, mains adapter 211, electronic device 220 and battery 222 correspond respectively to PCU 110, communication module 112, charging IC 114, mains adapter 111, electronic device 120 and battery 122, in FIG. 1. Likewise, each of the advantageous features enabled by use of communication module 112 and charging IC 114 of PCU 110, as described above, can also be enabled by use of communication module 212 and charging IC 214 of PCU 210. Although smart charging system 200 lacks a battery analogous to battery 113 of smart charging system 100 of FIG. 1, it is understood that PCU 210 can be alternatively configured with a similar battery having all the same features and benefits as those discussed with respect to battery 113, above.

According to the embodiment of FIG. 2, power transfer and communication are implemented wirelessly. Power may be transferred from PCU 210 to electronic device 220 through wireless power conduit 216 by inductive coupling, or resonant inductive coupling, for example, as known in the art. In one embodiment, communication module 212 can be configured to use wireless power conduit 216 as a wireless communication channel. Communication module 212 can also be configured to support any suitable wireless communication link independent of the inductive link used for power transfer, such as a Bluetooth, Bluetooth LE, WiFi, or NFC mediated link, for example, either in addition to or as an alternative to a wireless communication channel established over wireless power conduit 216.

Figure 3:
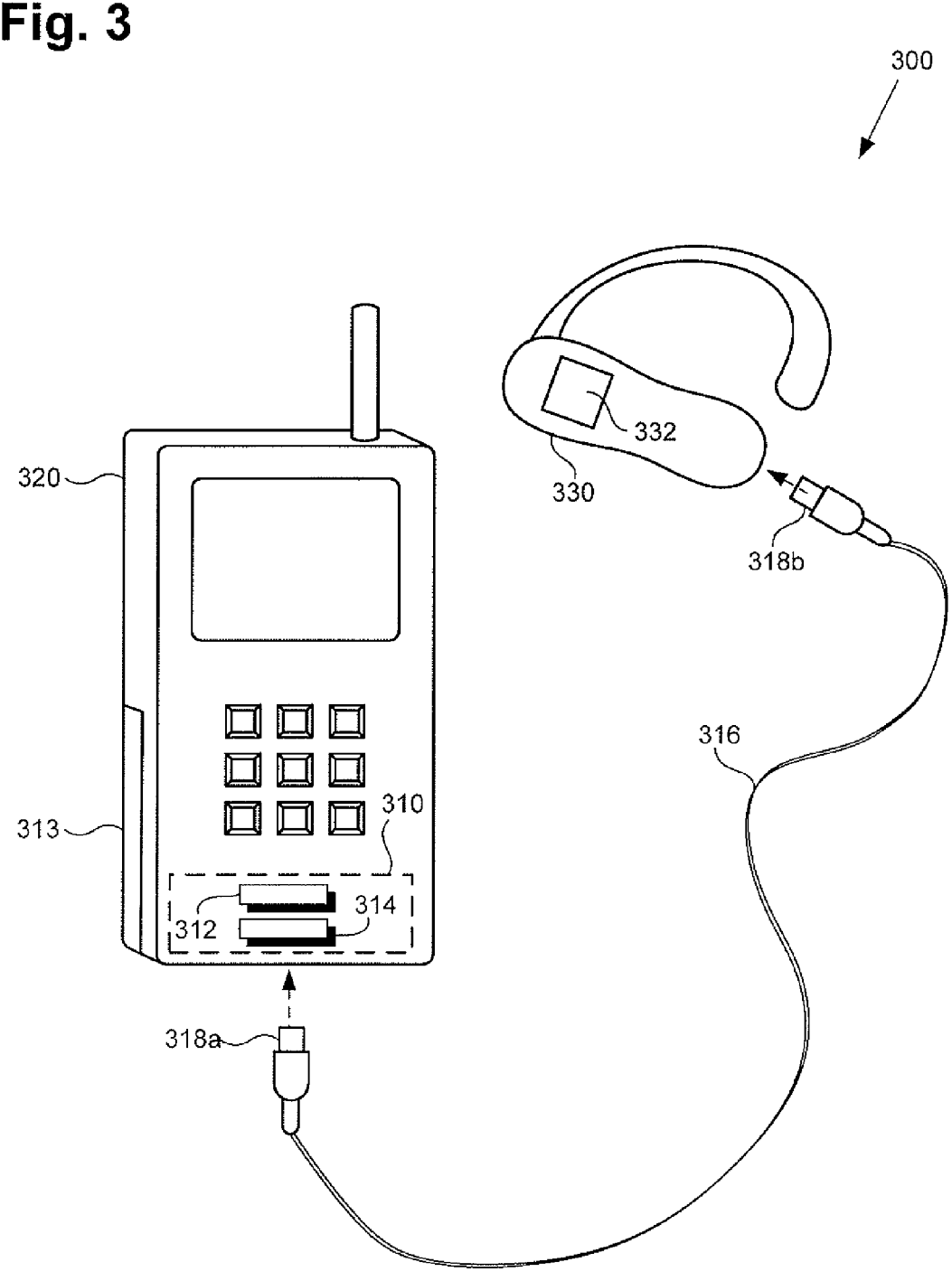
FIG. 3 illustrates a modular view of a smart charging system, according to a third embodiment of the present invention.

FIG. 3 illustrates a further example of a smart charging system, according to the present inventive principles, which provides a portable electronic device 320 having a relatively large charge storage capacity, represented as battery 313, that can be used as a portable supplemental or secondary power source for electronic device 330. Smart charging system 300 includes portable electronic device 320, which can comprise PCU 310 including communication module 312 and charging IC 314, and, as shown in FIG. 3, can be configured to draw power from battery 313. Also shown in FIG. 3 is electronic device 330 having battery 332 connected to portable electronic device 320 through wired power conduit 316 and modular connectors 318a and 318b. PCU 310, communication module 312, battery 313, charging IC 314, electronic device 330, battery 332, wired power conduit 316 and modular connectors 318a and 318b correspond respectively to PCU 110, communication module 112, battery 113, charging IC 114, electronic device 120, battery 122, wired power conduit 116 and modular connector 118, in FIG. 1. Likewise, each of the advantageous features enabled by use of communication module 112, battery 113 and charging IC 114 of PCU 110, as described above, can also be enabled by use of communication module 312, battery 313 and charging IC 314 of portable electronic device 320, but with respect to connected electronic device 330, as explained more fully below.

In embodiments such as smart charging system 300 shown in FIG. 3, in which portable electronic device 320 serves as a portable supplemental or secondary power source for electronic device 330, charging IC 314 can be configured to maximize the charge life of smart charging system 300 by supplying only enough power for electronic device 330 to function, for example, rather than attempting to charge battery 332. Alternatively, charging IC 314 can be configured to charge battery 332 in order to, for example, allow electronic device 330 to be used independently of portable electronic device 320. As with charging IC 114 of PCU 110 above, charging IC 314 of PCU 310 can also be configured to charge battery 313 using power supplied by, for example, a power mains adapter (not shown in FIG. 3).

FIG. 4 shows a flowchart illustrating a method for charging an electronic device according to an embodiment of the present invention. Certain details and features have been left out of flowchart 400 that are apparent to a person of ordinary skill in the art. For example, a step may consist of one or more substeps or may involve specialized equipment or materials, as known in the art. Steps 401 through 403 indicated in flowchart 400 are sufficient to describe one embodiment of the present invention; however, other embodiments of the invention may make use of steps different from those shown in flowchart 400.

Referring now to step 401 of the method embodied in FIG. 4, step 401 of flowchart 400 comprises detecting a connection between an electronic device and a PCU. The electronic device may be, for example, any chargeable electronic device. The PCU can comprise a communication module and a charging IC, and can be configured to draw power from a mains adapter, such as the PCUs described above. The detected connection may be over a wired or wireless power conduit, a wired or wireless communication channel, or any combination of those, and can be detected, for example, through a cooperative effort between the communication module and the charging IC, or by the charging IC alone through a change in, for example, a measured output impedance of the PCU.

Continuing with step 402 in FIG. 4, step 402 of flowchart 400 comprises attempting to establish a communication link between the electronic device and the PCU. Upon detection of a connection, as described in step 401, the communication module of the PCU may attempt to communicate with the connected electronic device by, for example, sending a query over a wired or wireless communication channel. The communication module may initiate the attempt itself, for example, or may do so at the request of the charging IC.

Moving now to step 403 in FIG. 4, step 403 of flowchart 400 comprises using the information gathered from the communication attempt performed in step 402 to select an operating mode for the charging IC that optimizes charging the electronic device. Information gathered from the attempt may include, for example, a charging profile, a charging state, a requested charging power characteristic (e.g., a current and/or voltage limit), or a target charge time. Optimizing charging the electronic device may include, but is not limited to, modifying the charging power to conform to a specific charging parameter or simply disconnecting the electronic device from the PCU.

For instance, in the event that the electronic device does not or cannot communicate with the PCU, the charging IC may choose to either disconnect the electronic device entirely or, for example, apply a safe mode, as described above, to the connection to the electronic device. If, alternatively, the electronic device communicates a particular target charge time, for example, the charging IC may choose to disconnect the device completely for some period of time, rather than apply a safe mode, or choose to use a relatively low charging power over a longer period of time (e.g., a trickle charge, as known in the art), for example, in order to maximize the overall efficiency of the system while the electronic device is connected. As can be seen, the operating mode selection process allows the charging IC to maximize the efficiency of the system while taking into account information assembled from the attempted communication, thereby optimizing charging the electronic device.

Therefore, by providing a smart charging system having the ability to communicate with connected electronic devices, and also having the ability to programmatically adjust a charging power in response to those communications, the present inventive concepts provide a smart charging system that can significantly reduce waste, both in the form of material resources as well as electrical energy, by being capable of conveniently and efficiently charging a wide variety of electronic devices. Further, by being able to adjust a charging power to meet the requirements of many different electronic devices, the present inventive concepts also allow battery operated electronic devices to be manufactured without charging logic, sensing, and power regulation circuitry, thereby extending their operating lifetime (e.g., by reducing waste heat generated in their internal circuitry) while reducing their overall manufacturing cost.

From the above description of the invention it is manifest that various techniques can be used for implementing the concepts of the present invention without departing from its scope. Moreover, while the invention has been described with specific reference to certain embodiments, a person of ordinary skill in the art would appreciate that changes can be made in form and detail without departing from the spirit and the scope of the invention. Thus, the described embodiments are to be considered in all respects as illustrative and not restrictive. It should also be understood that the invention is not limited to the particular embodiments described herein but is capable of many rearrangements, modifications, and substitutions without departing from the scope of the invention.

What is claimed is:

1. A smart charging system comprising:
   a power conversion unit (PCU) configured to draw power through a mains adapter, the PCU including a communication module and a charging integrated circuit (IC);
   a power conduit configured to connect the PCU to any of a plurality of electronic devices having different charging parameters, said plurality of electronic devices, including a first electronic device with a first power requirement and a second electronic device with a second power requirement that is different than the first power requirement;
   the communication module and the charging IC being disposed in the first electronic device and configured to
     adjust an output voltage of the PCU based on a charging parameter of the first electronic device to charge the first electronic device at the first power requirement;
     manage charging of the first electronic device over the power conduit using the output voltage;
     adjust the output voltage of the PCU based on a charging parameter of the second electronic device to charge the second electronic device at the second power requirement;
     manage charging the second electronic device over the power conduit by supplying enough power from the first electronic device for the second electronic device to function, but without charging a battery in the second electronic device;
     discontinue charging of one or more of the plurality of electronic devices over the power conduit when a battery temperature of each of the one or more of the plurality of electronic devices exceeds a maximum battery temperature rating corresponding to each of the one or more of the plurality of electronic devices.

2. The smart charging system of claim 1, wherein the power conduit comprises a wired power connection.

3. The smart charging system of claim 1, wherein the power conduit comprises a wireless power connection.

4. The smart charging system of claim 1, wherein the communication module is configured to form a communication channel over the power conduit.

5. The smart charging system of claim 1, wherein the communication module is configured to form a wireless communication channel separate from the power conduit.

6. The smart charging system of claim 1, wherein the communication module and the charging IC are configured to communicate with the first electronic device and receive the charging parameter of the first electronic device, the charging of the first electronic device being managed according to the charging parameter of the first electronic device.

7. The smart charging system of claim 1, wherein the PCU further comprises a battery, the PCU further configured to draw power from the battery when the mains adapter is not powered.

8. The smart charging system of claim 7, wherein the charging IC is further configured to charge the battery when the mains adapter is powered.

9. The smart charging system of claim 7, wherein the PCU is comprised by a portable electronic device, the portable electronic device being configured to manage charging of the electronic device.

10. A power conversion unit (PCU) for use in a smart charging system, the PCU comprising:
- a communication module configured to support communications with any of a plurality of electronic devices having different charging parameters, said plurality of electronic devices, including a first electronic device with a first power requirement and a second electronic device with a second power requirement that is different than the first power requirement;
- a charging integrated circuit (IC) disposed in the first electronic device configured to adjust an output voltage of the PCU based on a charging parameter of the first electronic device to charge the first electronic device at the first power requirement;
- manage charging of any of the plurality of electronic devices using the output voltage;
- adjust the output voltage of the PCU based on a charging parameter of the second electronic device to charge the second electronic device at the second power requirement;
- manage charging the second electronic device over a power conduit by supplying enough power from the first electronic device for the second electronic device to function, but without charging a battery in the second electronic device;
- discontinue charging of one or more of the plurality of electronic devices over the power conduit when a battery temperature of each of the one or more of the plurality of electronic devices exceeds a maximum battery temperature rating corresponding to each of the one or more of the plurality of electronic devices.

11. The PCU of claim 10, wherein the PCU is configured to communicate with one of the plurality of electronic devices over a wireless communication channel.

12. The PCU of claim 10, wherein the PCU is configured to communicate with the first electronic device via a communication channel established by the communication module and receive the charging parameter of the first electronic device, the charging of the first electronic device being managed according to the charging parameter of the first electronic device.

13. The PCU of claim 12, wherein the charging parameter of the first electronic device comprises a charging profile for the first electronic device.

14. The PCU of claim 12, wherein the charging parameter of the first electronic device comprises a charge state of the first electronic device.

15. The PCU of claim 12, wherein the charging parameter of the first electronic device comprises a charging power characteristic for the first electronic device.

16. The PCU of claim 12 further comprising a battery, the charging IC being configured to draw charging power from the battery.

17. A method for charging electronic devices, the method comprising:
- detecting a connection between a power conversion unit (PCU) configured to draw power through a mains adapter and any of a plurality of electronic devices, the PCU including a communication module and a charging integrated circuit (IC) disposed in a first electronic device;
- initially establishing a communication link between the PCU and one of the plurality of electronic devices, the plurality of electronic devices having different charging parameters, said plurality of electronic devices, including the first electronic device with a first power requirement and a second electronic device with a second power requirement that is different than the first power requirement;
- using a result of the initially establishing to adjust an output voltage of the PCU based on a parameter of the first electronic device to charge the first electronic device at the first power requirement;
- selecting an operating mode for the charging IC, the operating mode being configured to manage charging of the first electronic device using the output voltage;
- adjusting the output voltage based on a charging parameter of the second electronic device to charge the second electronic device at the second power requirement;
- managing charging of the second electronic device by supplying enough power from the first electronic device for the second electronic device to function, but without charging a battery in the second electronic device;
- discontinuing charging of one or more of the plurality of electronic devices over a power conduit when a battery temperature of each of the one or more of the plurality of electronic devices exceeds a maximum battery temperature rating corresponding to each of the one or more of the plurality of electronic devices.

18. The method of claim 17, operating the charging IC in a safe mode when communications with the second electronic device is attempted but not established.

19. The method of claim 17, wherein the operating mode of the charging IC optimizes power delivery to the first electronic device, according to the charging parameter of the first electronic device.

20. The method of claim 17, wherein the PCU further includes a battery, the PCU being configured to draw power from the battery when the mains adapter is unpowered.

* * * * *